United States Patent
Okui

(10) Patent No.: US 10,155,394 B2
(45) Date of Patent: Dec. 18, 2018

(54) METHOD FOR MANUFACTURING VALVE UNIT, AND VALVE UNIT

(71) Applicant: SEIKO EPSON CORPORATION, Tokyo (JP)

(72) Inventor: Hiroaki Okui, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 15/171,626

(22) Filed: Jun. 2, 2016

(65) Prior Publication Data
US 2016/0375693 A1  Dec. 29, 2016

(30) Foreign Application Priority Data
Jun. 23, 2015 (JP) ................. 2015-125409

(51) Int. Cl.
| | | |
|---|---|---|
| F16K 31/00 | (2006.01) | |
| B41J 2/175 | (2006.01) | |
| B29C 65/30 | (2006.01) | |
| B29C 65/16 | (2006.01) | |
| B29C 65/00 | (2006.01) | |
| F16K 7/17 | (2006.01) | |
| B29K 667/00 | (2006.01) | |
| B29L 31/00 | (2006.01) | |

(52) U.S. Cl.
CPC ....... B41J 2/17596 (2013.01); B29C 65/1635 (2013.01); B29C 65/30 (2013.01); B29C 66/53421 (2013.01); F16K 7/17 (2013.01); B29K 2623/12 (2013.01); B29K 2667/003 (2013.01); B29L 2031/7506 (2013.01)

(58) Field of Classification Search
CPC ................. F16K 7/17; B41J 2/17596
USPC ........................................................ 251/61.4
See application file for complete search history.

(56) References Cited

U.S. PATENT DOCUMENTS

| | | | | |
|---|---|---|---|---|
| 571,833 | A * | 11/1896 | Hunter | F16K 31/1262 251/61.4 |
| 1,249,293 | A * | 12/1917 | Norwood | E03D 3/04 137/624.22 |
| 1,939,150 | A * | 12/1933 | Terry | F16K 17/10 137/505.13 |
| 2,382,625 | A * | 8/1945 | Garretson | F02M 69/00 137/100 |

(Continued)

FOREIGN PATENT DOCUMENTS

JP         2013-124713 A       6/2013

Primary Examiner — Umashankar Venkatesan
(74) Attorney, Agent, or Firm — Workman Nydegger

(57) ABSTRACT

A method for manufacturing a valve unit includes fixing a first flow channel member and a flexible member to one another, the first flow channel member including a first surface, a second surface and a through-hole passing through the first surface and the second surface, in a manner in which the flexible member is supported by a fixing member and the through-hole is covered at the first surface side thereof by the flexible member; and fixing the first flow channel member and a second flow channel member, the second flow channel member including a hole through which a valve body passes, in a manner in which the through-hole is in communication with the hole at the second surface side of the through-hole, the valve body configured to open and close a flow channel in communication with the through-hole according to displacement of the flexible member.

11 Claims, 5 Drawing Sheets

(56) References Cited

U.S. PATENT DOCUMENTS

| | | | | |
|---|---|---|---|---|
| 2,705,046 | A * | 3/1955 | Schroeder | G05D 7/0106 137/501 |
| 2,867,227 | A * | 1/1959 | Meidenbauer | A62B 9/02 128/204.26 |
| 3,241,805 | A * | 3/1966 | Schumann | F16K 1/482 251/61.4 |
| 4,040,440 | A * | 8/1977 | Zaki | F16K 47/02 137/375 |
| 6,988,710 | B2 * | 1/2006 | Igarashi | F16K 7/17 137/468 |
| 8,080,749 | B2 * | 12/2011 | Matsuhashi | B29C 65/7802 200/293 |
| 9,010,719 | B2 * | 4/2015 | Hirai | F16K 31/1266 251/61.1 |
| 9,315,041 | B2 * | 4/2016 | Moriguchi | B41J 2/17596 |
| 2007/0181842 | A1 * | 8/2007 | Igarashi | F16K 7/14 251/366 |
| 2011/0315787 | A1 * | 12/2011 | Linton | B08B 3/026 239/124 |
| 2012/0127242 | A1 * | 5/2012 | Koike | B41J 2/175 347/85 |
| 2012/0194620 | A1 * | 8/2012 | Matsumoto | B41J 2/16523 347/85 |
| 2014/0209183 | A1 * | 7/2014 | Stoney | F16K 7/17 137/78.1 |
| 2015/0233484 | A1 * | 8/2015 | Maeda | F16K 15/185 251/335.2 |
| 2015/0369379 | A1 * | 12/2015 | Smith | F16K 41/103 137/494 |
| 2016/0184502 | A1 * | 6/2016 | Kreber | A61M 1/14 210/137 |
| 2017/0087867 | A1 * | 3/2017 | Sato | B41J 2/17596 |

* cited by examiner

METHOD FOR MANUFACTURING VALVE UNIT, AND VALVE UNIT

BACKGROUND

1. Technical Field

The present invention relates to a method for manufacturing a valve unit that supplies a liquid (an ink) to a liquid droplet ejecting head (a recording head) from a liquid supply source, and to a valve unit manufactured using the corresponding manufacturing method.

2. Related Art

In the related art, there is known an ink jet type recording apparatus that records or prints images on a recording medium by moving, relative to the recording medium, a liquid droplet ejecting head (a recording head) that ejects an ink as liquid droplets.

For example, in the above-mentioned recording head, ink inside an ink cartridge (a liquid supply source), in which ink in liquid form is stored, is introduced into a pressure chamber through a reservoir (a common liquid chamber) of a recording head, a pressure fluctuation is applied to ink inside the pressure chamber by driving a pressure generation unit such as a piezoelectric vibration element or a heat-emitting element, and the ink is ejected from nozzles that are in communication with the pressure chamber by using the pressure fluctuation. In a recording head with this configuration, a valve unit is provided midway through a flow channel that supplies the ink to the recording head from the ink cartridge.

The valve unit includes a valve body (a valve), which opens and closes the flow channel therein, and a film that seals an opening surface of the flow channel. When the internal pressure inside the flow channel decreases as a result of liquid droplets being ejected from the nozzles of the recording head, the film is displaced toward the valve body, and the film applies a pressing force on the valve body. As a result, the flow channel is opened and the ink from the liquid supply source is supplied to a recording head side via the flow channel of the valve unit. Meanwhile, when the ink from the liquid supply source is introduced and the internal pressure of the flow channel increases, the film is displaced away from and becomes separated from the valve body. As a result, the flow channel is closed and the supply of the liquid to the recording head side is stopped. That is, the flow channel is opened and closed as a result of displacement of the film, and the flow pressure of the ink that is supplied to the recording head is controlled.

In order for the valve unit to operate properly, it is important for the film to be properly displaced. For example, when there are abnormalities such as wrinkles in the film, a variation in the rigidity of the film surface occurs, and displacement of the film becomes non-uniform. Therefore, the film is sealed or heat-sealed to the opening surface of the flow channel, with tension applied by a jig and tool as in, for example, JP-A-2013-124713. When the film is sealed with applied tension, it is difficult for wrinkles to be generated. Therefore, the film is properly displaced, and the valve body operates properly.

However, in JP-A-2013-124713, since positioning of the film is performed by only applying tension to the film, there is a concern that the film will be sealed in a manner in which the position of the film with respect to the valve body and the position of a pressure receiving plate with respect to the valve body are shifted, and as a result proper operation of the valve body will not be possible.

SUMMARY

The invention can be realized in the following forms and application examples.

Application Example 1

According to this application example, there is provided a method for manufacturing a valve unit, the method including fixing a first flow channel member and a flexible member to one another in a manner in which the flexible member is supported by a fixing member and a through-hole is covered at a first surface side thereof by the flexible member; and fixing the first flow channel member and a second flow channel member, the second flow channel member including a hole through which a valve body passes, in a manner in which the through-hole is in communication with the hole at a second surface side of the through-hole, the valve body configured to open and close a flow channel in communication with the through-hole according to displacement of the flexible member.

In the covering with the flexible member, since the flexible member is fixed or caused to adhere to the first flow channel member in a manner in which the flexible member is supported by the fixing member, it is possible to fix the flexible member to the first flow channel member in a manner in which a positional shift of the flexible member with respect to the valve body is reduced when wrinkles or the like are generated in the flexible member. Therefore, it is possible to manufacture a valve unit having a flexible member that is properly displaced.

Application Example 2

In the method for manufacturing a valve unit according to the application example, it is preferable that the flexible member include one surface that is fixed to the first flow channel member and another surface opposite of the one surface. The flexible member and the first flow channel member can be fixed in a manner in which the flexible member is supported by the fixing member in a direction from the one surface to the other surface.

The flexible member is supported by the fixing member in a direction from the one surface to the other surface. That is, the one surface of the flexible member is supported by the fixing member, and the flexible member and the first flow channel member are fixed in a manner in which it is difficult for the flexible member to move. Accordingly, it is difficult for a positional shift of the flexible member to occur. Therefore, it is possible to accurately fix the flexible member to the first flow channel member.

Application Example 3

In the method for manufacturing a valve unit according to the application example, it is preferable that a pressure receiving plate be fixed to the flexible member, and that, the flexible member and the first flow channel member are fixed in a manner in which the pressure receiving plate is supported by the fixing member.

In covering the first flow channel member with the flexible member, it is difficult for the pressure receiving plate, which is supported by the fixing member, to move. Therefore, it is also difficult for the flexible member, to which the pressure receiving plate is fixed, to move. Accordingly, in covering the first flow channel member with the flexible member, it is difficult for a positional shift of both the pressure receiving plate and the flexible member to occur. Therefore, it is possible to accurately fix both the pressure receiving plate and the flexible member to the first flow channel member.

Application Example 4

In the method for manufacturing a valve unit according to the application example, it is preferable that, the flexible member and the first flow channel member are fixed in a manner in which the flexible member is displaced with respect to a fixing surface of the flexible member and the first flow channel member.

When the flexible member is displaced, a moderate amount of tension is applied to the flexible member. Therefore, it is difficult for wrinkles to be generated in the flexible member in covering the first flow channel member with the flexible member.

Application Example 5

In the method for manufacturing a valve unit according to the application example, it is preferable that, in covering the first flow channel member with the flexible member, the flexible member and the first flow channel member are fixed by thermal welding in a manner in which the flexible member is displaced in a direction from the other surface to the one surface, as a result of suction from a side of the one surface.

When the flexible member is displaced as a result of suction from a side of the one surface, it is difficult for unnecessary heating of the displaced portions to have an effect on the flexible member. That is, it is possible to fix the flexible member and the first flow channel member by thermal welding, while suppressing adverse effects of unnecessary heating of the displaced portions on the flexible member.

Application Example 6

In the method for manufacturing a valve unit according to the application example, it is preferable that, when viewed in a direction from the one surface to the other surface, a portion in which the flexible member and the first flow channel member are fixed overlap a portion in which the first flow channel member and the second flow channel member are fixed.

When viewed from the one surface to the other surface, when a portion, in which the flexible member and the first flow channel member are fixed, is manufactured so as to overlap another portion, in which the first flow channel member and the second flow channel member are fixed, it is possible to reduce the dimension of the valve unit in a direction that intersects a direction from the one surface to the other surface. This is compared with a case in which a portion in which the flexible member and the first flow channel member are fixed is manufactured so as not to overlap the another portion in which the first flow channel member and the second flow channel member are fixed.

Application Example 7

In the method for manufacturing a valve unit according to the application example, it is preferable that, when viewed in a direction from the one surface to the other surface, a positioning pin, which positions the first flow channel member and the second flow channel member, is provided on an inner side of a portion in which the first flow channel member and the second flow channel member are fixed.

When viewed in a direction from the one surface to the other surface, when a positioning pin, which positions the first flow channel member and the second flow channel member, is provided on an inner side of a portion in which the first flow channel member and the second flow channel member are fixed, it is possible to align the first flow channel member and the second flow channel member with high accuracy by using the positioning pin, while reducing the dimension of the valve unit in a direction that intersects a direction from the one surface to the other surface.

Application Example 8

In the method for manufacturing a valve unit according to the application example, it is preferable that, in the covering the first flow channel member with the flexible member, the flexible member and the first flow channel member can be fixed by laser welding and that in the fixing of the second flow channel member and the first flow channel member the first flow channel member and the second flow channel member can be fixed by laser welding.

In laser welding, a portion that is irradiated by laser light is heated locally, and it is possible to suppress unnecessary adverse effects in comparison with heating with, for example, a heater tool.

Application Example 9

According to this application example, there is provided a valve unit including a first flow channel member including a first surface, a second surface and a through-hole that passes through the first surface and the second surface; a flexible member covers the through-hole at the first surface side of the through-hole; a second flow channel member is fixed to the first flow channel member, which includes a hole with which the through-hole is in communication at a second surface side of the through-hole; and a valve body that passes through the hole and is configured to open and close, according to displacement of the flexible member, a flow channel, the flow channel being in communication with the through-hole.

The valve unit is provided with the first flow channel member, in which the through-hole is covered with the flexible member, the second flow channel member that includes the hole, the hole being in communication the through-hole, and the valve body that is capable of opening and closing, by causing displacement of the flexible member, the hole, which is in communication with the through-hole. That is, the valve unit is provided with the first flow channel member, in which the through-hole is covered with the flexible member by using a manufacturing method in which it is difficult for abnormalities such as wrinkles to be generated in the flexible member, the second flow channel member, and the valve body that is capable of opening and closing a flow channel, which is in communication with the through-hole, by causing displacement of the flexible member.

Accordingly, since a flexible member that does not have abnormalities such as wrinkles is properly displaced and the valve body that performs opening and closing by causing displacement of the flexible member also operates properly, the valve unit according to the present application example operates properly.

Application Example 10

In the valve unit according to the application example, it is preferable that one of the first flow channel member and the second flow channel member be a transmissive member that transmits laser light and that the other of the first flow channel member and the second flow channel member be a non-transmissive member that does not transmit laser light.

When one of the first flow channel member and the second flow channel member is configured using a transmissive member that transmits laser light, and the other of the first flow channel member and the second flow channel member is configured by a non-transmissive member that does not transmit laser light, it is possible to fix the first flow channel member and the second flow channel member to one another by laser welding. In laser welding, since a portion that is irradiated by laser light is heated locally, it is possible to suppress unnecessary adverse effects in comparison with heating with, for example, a heater tool.

Application Example 11

In the valve unit according to the application example, it is preferable that the flexible member includes one surface that is fixed to the first flow channel member, and another surface on a side that is opposite to the one surface, and that, when viewed in a direction from the one surface to the other surface, a portion in which the flexible member and the first flow channel member are fixed, overlaps a portion in which the first flow channel member and the second flow channel member are fixed.

When viewed in a direction from the one surface to the other surface, when a portion, in which the flexible member and the first flow channel member are fixed, is manufactured so as to overlap another portion, in which the first flow channel member and the second flow channel member are fixed, it is possible to reduce the dimension of the valve unit in a direction that intersects a direction from the one surface to the other surface. This is compared with a case in which a portion, in which the flexible member and the first flow channel member are fixed, is manufactured so as not to overlap another portion, in which the first flow channel member and the second flow channel member are fixed.

Application Example 12

In the method for manufacturing a valve unit according to the application example, it is preferable that, when viewed in a direction from the one surface to the other surface, a positioning pin that positions the first flow channel member and the second flow channel member, is provided on an inner side of a portion in which the first flow channel member and the second flow channel member are fixed.

When viewed in a direction from the one surface to the other surface, when a positioning pin that positions the first flow channel member and the second flow channel member, is provided on an inner side of a portion in which the first flow channel member and the second flow channel member are fixed, it is possible to align the first flow channel member and the second flow channel member with high accuracy by using the positioning pin, while reducing the dimension of the valve unit in a direction that intersects a direction that faces from the one surface to the other surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. The embodiments illustrate aspects of the invention but do not limit the invention and can be changed arbitrarily within a range of the technical idea of the invention. In addition, in each of the drawings below, the scale for each layer and each location has been altered to make each layer and each location have a size that is easy to understand.

Embodiment 1

Figure 1:
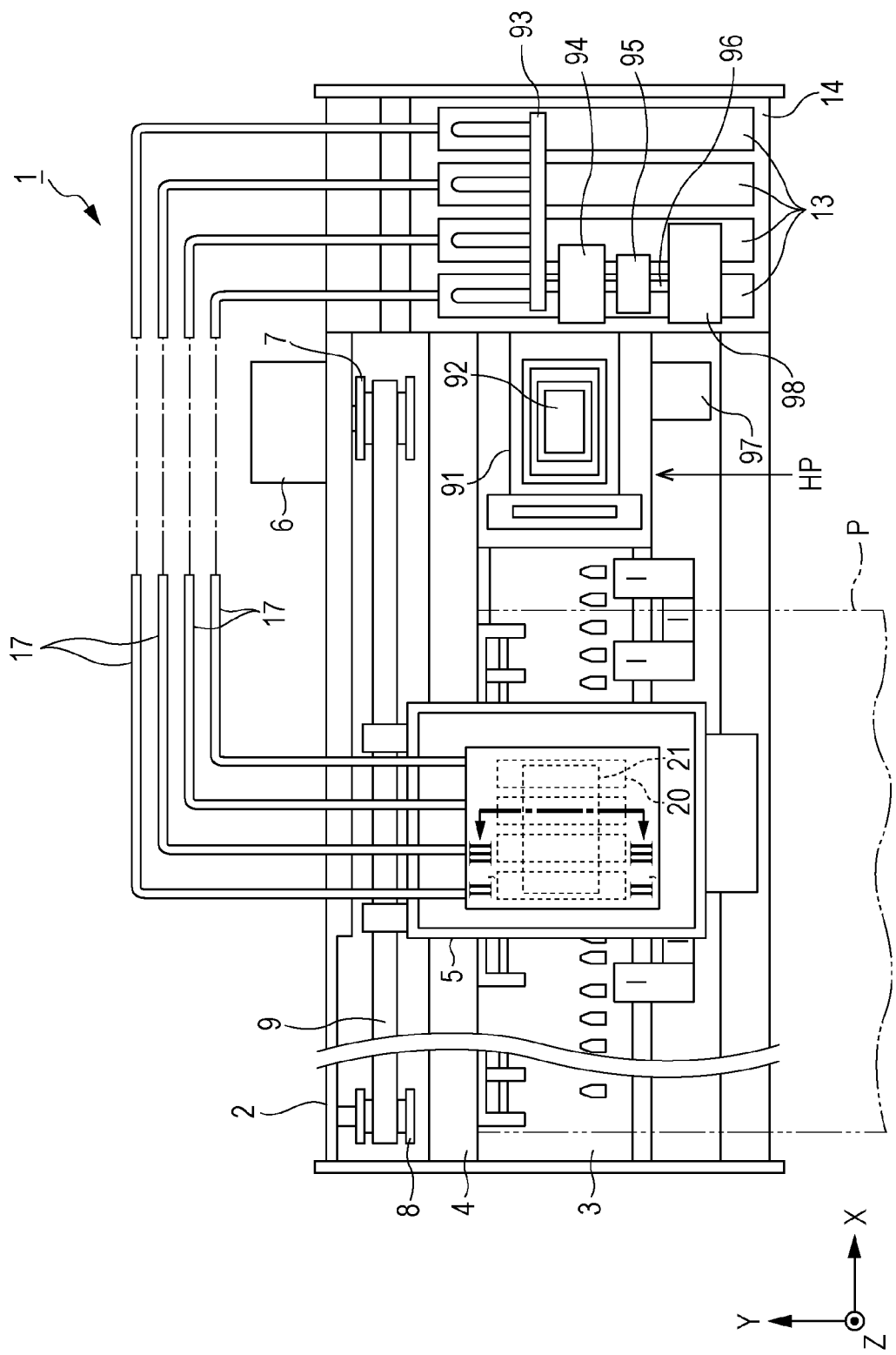
FIG. 1 is a schematic plan view that shows a configuration of an ink jet type recording apparatus according to Embodiment 1.

FIG. 1 is a schematic plan view that shows a configuration of an ink jet type recording apparatus (hereinafter, referred to as a printer) according to Embodiment 1. A printer 1 is an apparatus that performs recording or printing of an image, or the like, on a recording medium P, such as recording paper, by ejecting an ink in liquid form onto a surface of the recording medium P.

As shown in FIG. 1, the printer 1 includes a main body case 2 having a substantially rectangular box form, and a platen 3 installed in a front lower section inside the main body case 2 in a longitudinal direction (the left-right direction in FIG. 1) of the main body case 2, which corresponds to a main scanning direction. The platen 3 is a support platform having a substantially rectangular shape and that supports a recording medium P, such as sheets of recording paper. A recording medium P is transported on the platen 3 in a sub-scanning direction (a forward direction), which is orthogonal to the main scanning direction, by using a paper feeding mechanism (not illustrated in the drawing).

A rod-shaped guide shaft 4, which extends in the main scanning direction, is provided in a hanging manner above the rear section of the platen 3. A carriage 5 is supported by the guide shaft 4 and is capable of moving in the main scanning direction. In addition, a driving pulley 7 and a driven pulley 8 are rotatably supported by a posterior side surface, inside the main body case 2, at positions that correspond to both end sections of the guide shaft 4. A pulse motor 6 is connected to the driving pulley 7. An endless timing belt 9 is hung between the driving pulley 7 and the driven pulley 8. Further, since a rear end side of the carriage 5 is connected to the timing belt 9, the carriage 5 is capable of reciprocating in the main scanning direction along the guide shaft 4 as a result of driving of the pulse motor 6.

A box-shaped cartridge holder 14 is provided on an end side (the right end side in FIG. 1) inside the main body case 2. A plurality of ink cartridges 13 are removably mounted in the cartridge holder 14. The ink cartridges 13, four of which are illustrated in FIG. 1, are fluid accommodation bodies in which ink is accommodated, such as colored inks. Additionally, the term ink includes color materials, solvents in which a color material is dispersed, or the like.

Each ink cartridge 13 is connected to an upstream end of an ink supply tube 17 as a result of being mounted in the cartridge holder 14. In addition, a downstream end of each ink supply tube 17 is connected to an upstream side of a valve unit 21, which is installed in the carriage 5, and a downstream side of the valve unit 21 is connected to a recording head 20 that is provided on a lower surface side of the carriage 5. Further, a plurality of nozzles 43 (refer to FIG. 2) that discharge an ink, are formed on a lower surface of the recording head 20. In other words, the recording head 20 and the valve unit 21 are mounted sequentially in the carriage 5.

In a case of viewing the valve unit 21 in a direction from the recording head 20, the valve unit 21 has an oblong shape. The valve unit 21 adjusts the flow pressure of an ink by supplying the ink to the recording head 20 so that the ink is discharged stably from the nozzles 43 of the recording head 20. In the present embodiment, a single flow pressure adjustment mechanism is built-into the valve unit 21 so that it is possible to adjust the flow pressure of the ink of a single color with the valve unit 21. In other words, valve units 21 are respectively connected to the four ink supply tubes 17.

In the following description, the longitudinal direction of the oblong-shaped valve unit 21 is set as the X direction, and the lateral direction of the oblong-shaped valve unit 21 is set as the Y direction. A direction from the recording head 20 to the valve unit 21, that is, a thickness direction of the valve unit 21, is set as the Z direction. Furthermore, tip end sides of the arrows that show the directions in the drawings are set as "(+) directions", and base end sides thereof are set as "(−) directions".

Additionally, the Y direction is an example of a "direction from the one surface to the other surface". Furthermore, viewing in the Y direction is an example of "a perspective view in a direction from the one surface to the other surface" and hereinafter, indicates a plan view. In addition, there are cases in which the Y direction will be referred to as a Y (+) direction.

Additionally, in the present embodiment, valve units (four valve units 21) corresponding to the number of types of ink (four types of ink) are mounted in an upper section of the recording head 20, but the invention is not limited to this. For example, a configuration in which two valve units are mounted for four types of ink is also possible. In other words, a configuration in which a plurality of systems of a flow pressure adjustment mechanism are built into a valve unit so that it is possible for the valve unit to adjust the flow pressure of the ink of a plurality of colors (for example, two colors).

A home position HP is provided between the cartridge holder 14 and the platen 3, that is, in a non-printing region to which the recording medium P is not transported. The home position HP corresponds to a standby location of the carriage 5 when a power source of the printer 1 is off or when performing maintenance of the recording head 20. In addition, a maintenance unit 91 for performing maintenance of the recording head 20 is provided at a position that corresponds to a lower portion when the carriage 5 is disposed at the home position HP.

The maintenance unit 91 is provided with a cap 92 and a suction pump 97. In a case in which the carriage 5 is disposed at the home position HP, the cap 92 abuts against the recording head 20 in a manner that surrounds the nozzles 43. Cleaning is performed by driving the suction pump 97 in a manner in which the cap 92 abuts against the recording head 20. Cleaning occurs when thickened ink, air bubbles, and the like are discharged from inside the recording head 20.

A pressurization pump 98 is disposed on an upper side of the cartridge holder 14. An upstream end of an air supply channel 96 is connected to the pressurization pump 98, and a pressure detector 95 and an atmosphere release valve 94 are connected to a midway position of the air supply channel 96. In addition, the air supply channel 96 is branched with a distributor 93, which is installed on the downstream side of the atmosphere release valve 94, with the same number of outlets as the number of ink cartridges 13.

Each branched air supply channel 96 is connected to an ink cartridge 13 to which the respectively downstream end thereof corresponds. Pressurized air that is created as a result of driving of the pressurization pump 98, is delivered under pressure into the inside of the ink cartridges 13 via the air supply channels 96, and ink that is accommodated in the ink cartridges 13 is pressurized and supplied to a side of the valve unit 21 as a result of a pressurizing force of the pressurized air.

Further, in the printer 1, a recording process is executed on a recording medium P by alternately repeating an operation that transports the recording medium P in the sub-scanning direction, and an operation that ejects the ink from the nozzles 43 of the recording head 20, which reciprocates in the main scanning direction with the carriage 5.

Recording Head and Valve Unit

Figure 2:
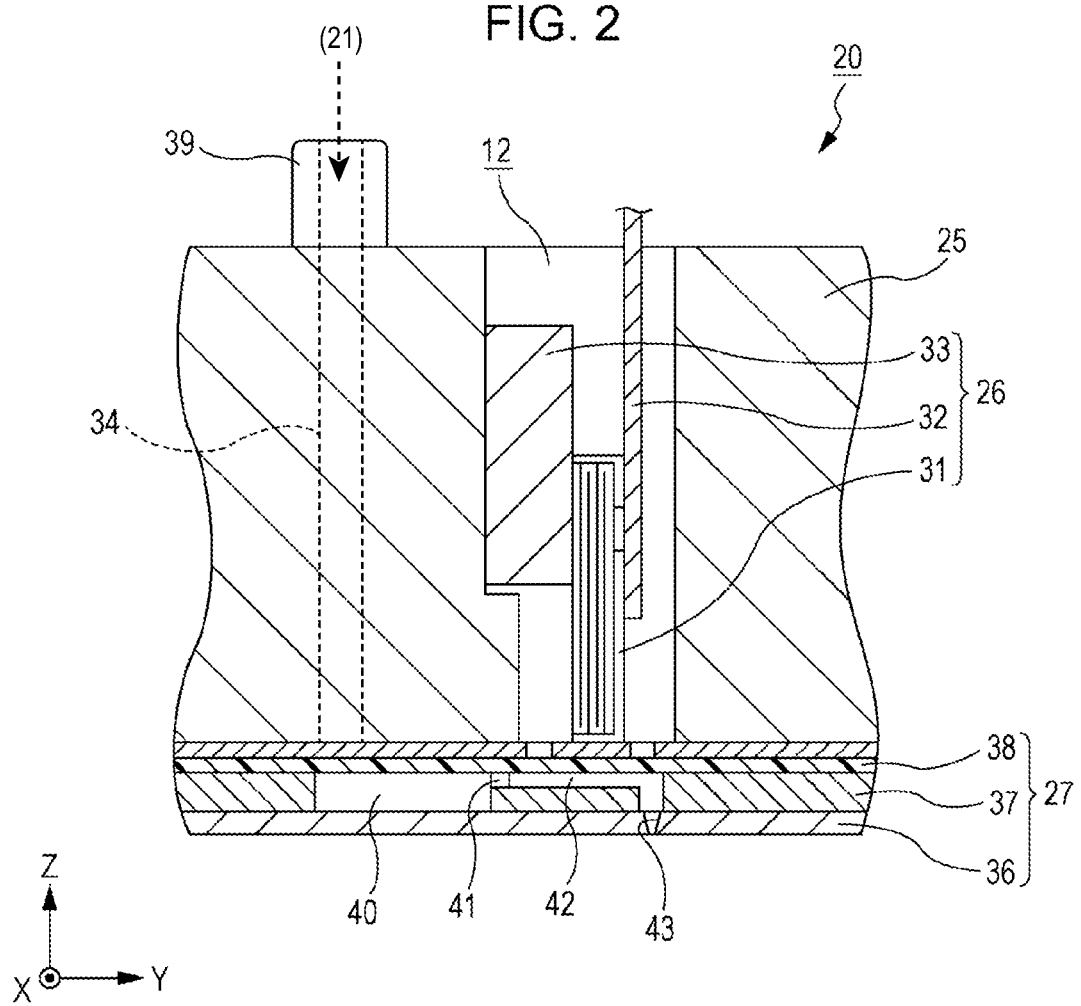
FIG. 2 is a cross-sectional view of a portion of a recording head disposed in a carriage along the line II-II in FIG. 1.
Figure 3:
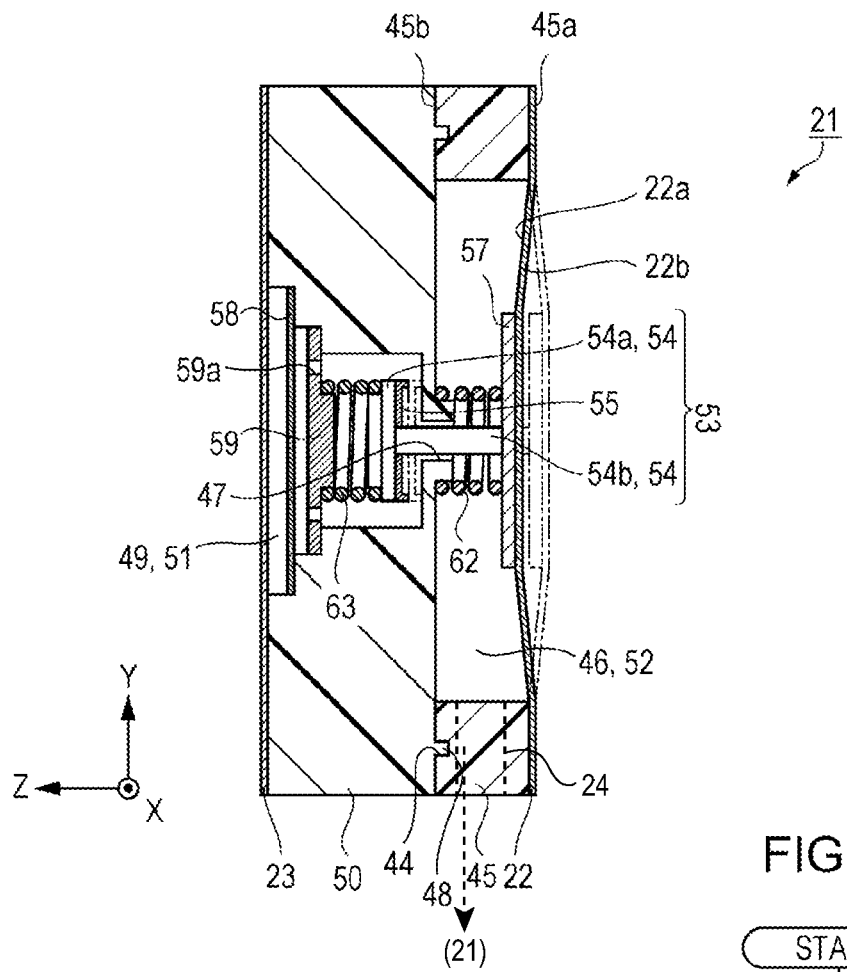
FIG. 3 is a cross-sectional view of a portion of a valve unit disposed in a carriage and that fluidly communicates with the recording head of FIG. 2 along the line III-III in FIG. 1.

FIG. 2 is a partial cross-sectional view of a recording head along the line II-II in FIG. 1. FIG. 3 is a partial cross-sectional view of a valve unit along the line III-III in FIG. 1. Since the recording head 20 and the valve unit 21 are mounted sequentially in the carriage 5, the sectional lines can be vertically spaced apart, with FIG. 2 and FIG. 3 depicting, respectively, a portion of the recording head and the valve unit.

Additionally, FIGS. 2 and 3 include dotted arrows illustrating flow of ink to the recording head 20 from the valve unit 21

Firstly, the configuration of the recording head 20 will be described with reference to FIG. 2.

As shown in FIG. 2, the recording head 20 includes a head case 25, a vibration element unit 26, and a flow channel unit 27.

The head case 25 is a hollow box-shaped member, and the flow channel unit 27 is fixed to a front end surface (the lower surface) thereof. The vibration element unit 26 is accommodated inside an accommodation space section 12, which is formed in an inner section of the head case 25. A case flow channel 34 is formed in an inner section of the head case 25 penetrating through the height direction thereof. The case flow channel 34 is a flow channel for the introduction of ink, which is supplied from the valve unit 21, into a common ink chamber 40, and one end of the case flow channel 34 is connected to the common ink chamber 40. In addition, the other end of the case flow channel 34 is connected to an ink lead-through channel 24 (schematically illustrated in the drawings) of the valve unit 21 via a gasket 39.

The vibration element unit 26 is configured by a plurality of piezoelectric vibration elements 31, which are lined up in comb tooth form, a flexible cable 32 for supplying driving signals to the piezoelectric vibration elements 31 from a driving substrate (not illustrated in the drawings), and a fixing plate 33 that fixes the piezoelectric vibration elements 31. The piezoelectric vibration elements 31 are joined to a flexible surface (a vibration plate 38) that partitions a portion of a pressure chamber 42. Further, the piezoelectric vibration elements 31 can bring about a pressure fluctuation in the ink inside the pressure chamber 42 by causing the cubic capacity of the pressure chamber 42 to expand or contract as a result of applying a driving signal. This pressure fluctuation can cause the ink to be ejected from the nozzles 43.

The flow channel unit 27 is prepared by joining together and integrating a nozzle formation plate 36, in which the nozzles 43 are provided in an open manner, a flow channel formation substrate 37 that forms ink flow channels, and the vibration plate 38 that seals an opening surface of the flow channel formation substrate 37. The nozzle formation plate 36, the flow channel formation substrate 37, and the vibration plate 38 are laminated together. The flow channel unit 27 is a unit member that forms a series of ink flow channels (liquid flow channels) from the common ink chamber 40 to the nozzles 43 passing through ink supply ports 41 and the pressure chamber 42. The pressure chamber 42 is branched from the common ink chamber 40, and is formed for each nozzle 43. Ink that is lead-through from the ink lead-through channel 24 of the valve unit 21 is supplied to the pressure chambers 42 via the common ink chamber 40. The flow channel unit 27 is joined to a front end surface of the head case 25 in a posture in which the nozzle formation plate 36 faces a lower side (a side of the platen 3 of the printer main body).

Next, the configuration of the valve unit 21 will be described with reference to FIG. 3.

As shown in FIG. 3, in the valve unit 21, a film 23, a second flow channel member 50, a first flow channel member 45, and a film 22 are disposed sequentially in the Y direction, and are respectively fixed or bonded to one another. Furthermore, the first flow channel member 45 has a surface 45a, which is disposed on a side of the film 22, and a surface 45b, which is disposed on a side of the second flow channel member 50. The film 22 has a surface 22a, which is fixed to the first flow channel member 45, and a surface 22b, which is on a side that is opposite to the surface 22a.

Additionally, the film 22 is an example of a "flexible member". The surface 45a of the first flow channel member 45 is an example of a "first surface", and the surface 45b of the first flow channel member 45 is an example of a "second surface". The surface 22a of the film 22 is an example of "one surface", and the surface 22b of the film 22 is an example of "another surface".

For example, the first flow channel member 45 is a member that is molded using a synthetic resin such as polypropylene. For example, the first flow channel member 45 includes carbon black, pigments, dyes, or the like, and absorbs laser light. In other words, the first flow channel member 45 is configured by a thermoplastic resin that absorbs laser light. The first flow channel member 45 includes a through-hole 46, which passes through the surface 45a and the surface 45b. The surface 45b of the first flow channel member 45 is fixed to the second flow channel member 50, and has concave sections 44 in portions that are fixed to the second flow channel member 50.

For example, the second flow channel member 50 is a member that is molded using a synthetic resin such as polypropylene, and is fixed to the first flow channel member 45. The second flow channel member 50 does not include carbon black, pigments, dyes, or the like, and transmits laser light. In other words, the second flow channel member 50 is configured by a thermoplastic resin that transmits laser light. The second flow channel member 50 includes a concave section 49 on a side that is opposite to the side on which the first flow channel member 45 is disposed. A hole 47, which is in communication with a side of the surface 45b of the through-hole 46, is formed in the vicinity of the center of the concave section 49. That is, the second flow channel member 50 has the hole 47, which is in communication with a side of the surface 45b of the through-hole 46. Furthermore, the second flow channel member 50 includes convex sections 48 in portions that are fixed to the first flow channel member 45.

Additionally, the concave sections 44 and convex sections 48 mentioned above are examples of "positioning pins".

The concave sections 44 of the first flow channel member 45 are fitted together with the convex sections 48 of the second flow channel member 50; the first flow channel member 45 and the second flow channel member 50 being disposed at predetermined positions. That is, it is possible to align the two members (the first flow channel member 45 and the second flow channel member 50) with high accuracy by providing the concave sections 44 and the convex sections 48. In other words, the positioning pins (the concave sections 44 and the convex sections 48) that position the first flow channel member 45 and the second flow channel member 50 are provided on the inner side, in plan view, of portions fixing the first flow channel member 45 and the second flow channel member 50 together.

Additionally, the concave sections 44 may be provided on one of the first flow channel member 45 and the second flow channel member 50, and the convex sections 48 may be provided on the other of the first flow channel member 45 and the second flow channel member 50. In other words, a configuration in which the convex sections 48 are provided on the first flow channel member 45, and the concave sections 44 are provided on the second flow channel member 50, is also possible.

In other words, the concave sections 44 are female fitting members, the convex sections 48 are male fitting members, and the it is possible to align the first flow channel member 45 and the second flow channel member 50 with high accuracy as a result of the male fitting member and the female fitting member fitting together with one another. For example, in a configuration in which one is a male side locking member (for example, a hook), the other is a female side locking member (for example, a groove), it is possible for the male side locking member to hook into the female side locking member. Therefore, the first flow channel member 45 and the second flow channel member 50 are aligned with high accuracy as a result of the male side locking member locking together with the female locking member.

The films 22 and 23 are members that have a flexible property. In addition to a flexible property, barrier properties with respect to moisture, oxygen and nitrogen are required in the films 22 and 23. Therefore, the films 22 and 23 have a laminated three-layered structure in which a polypropylene film layer having a flexible property, a barrier layer that is formed from silica (SiO$_2$), and a reinforcing layer that is formed from polyethylene terephthalate.

Furthermore, the films 22 and 23 transmit laser light. In other words, the films 22 and 23 include thermoplastic resins that transmit laser light.

Furthermore, a pressure receiving plate 57, which is formed using a material that is harder than the film 22, is fixed or attached to the center of the film 22. The pressure receiving plate 57 is configured by a plastic material such as polyethylene or polypropylene.

A spring 62 is disposed or fixed to a surface of the pressure receiving plate 57 that is opposite to the surface that is fixed to the film 22. One end of the spring 62 is fixed to the pressure receiving plate 57 of the film 22, and the other end of the spring 62 is fixed to the second flow channel member 50.

One side of the through-hole 46 of the first flow channel member 45, that is, a side of the surface 45a of the through-hole 46, is sealed by the film 22 that is pasted to the first flow channel member 45. The other side of the through-hole 46 of the first flow channel member 45, that is, a side of the surface 45b of the through-hole 46, is sealed by the second flow channel member 50 as a result of the second flow channel member 50 being fixed thereto. Furthermore, a region or a space of the first flow channel member 45 that is surrounded by the through-hole 46, the film 22 and the second flow channel member 50, corresponds to a pressure chamber 52.

Although this will be explained in more detail later, a flow channel for ink occurs when the flow channel is in an open state as a result of a valve body 53 moving in a Y (−) direction due to displacement of the film 22. To explain in more detail, when the film 22 is displaced to a state that is shown by a solid line in the figure, the pressure receiving plate 57, which is fixed to the film 22, applies a pressing force on the valve body 53 and the valve body 53 moves in the Y (−) direction. In this state, a flow channel for ink is open. Furthermore, when the film 22 is displaced to a state that is shown by a dashed-two dotted line in the figure, the valve body 53 moves in the Y (+) direction, and a state in which a flow channel of ink is closed is attained.

The pressure receiving plate 57 has a role of properly applying a force to the valve body 53 due to displacement of the film 22. As a result of displacement of the film 22, a force with which the film 22 applies a pressing force on the valve body 53 is applied to the valve body 53 via the pressure receiving plate 57. In order for the valve body 53 to operate properly, it is important for the film 22 to be displaced uniformly as a result of the pressure receiving plate 57 being disposed in the center of the through-hole 46 of the first flow channel member 45.

If the pressure receiving plate 57 is not disposed in the center of the through-hole 46 of the first flow channel member 45, or the displacement of the film 22 is inclined and is not uniform, it is easy for a force in an oblique direction (a direction that intersects the Y direction) to be applied to the valve body 53 from the pressure receiving plate 57. Therefore, there is a possibility that the valve body 53 will not move properly or normally.

In another configuration, the valve unit 21 does not include the pressure receiving plate 57. Even if a configuration that does not include the pressure receiving plate 57 is used, when the displacement of the film 22 is inclined, it is easy for a force in an oblique direction (a direction that intersects the Y direction) to be applied to the valve body 53 from the film 22. Therefore, there is a possibility that that the valve body 53 will not move properly or normally.

In plan view, portions of the film 22 and the first flow channel member 45 are fixed are disposed so as to overlap with portions in which the first flow channel member 45 and the second flow channel member 50 are fixed. By so doing, it is possible to miniaturize or make the valve unit 21 as compared with a case in which the film 22 and the first flow channel member 45 are fixed and disposed so as not to overlap, in plan view, with portions in which the first flow channel member 45 and the second flow channel member 50 are fixed.

An opening of the concave section 49 of the second flow channel member 50 is sealed by the film 23 as a result of the film 23 being pasted thereon. Furthermore, a region or a space of the second flow channel member 50 that is surrounded by the concave section 49 and the film 23, corresponds to an ink supply chamber 51. The ink supply chamber 51 is in communication with the pressure chamber 52 via the hole 47, which is provided in the vicinity of the concave section 49.

As illustrated in FIG. 3, a filter 58, and a spring receiving seat 59 are sequentially disposed in the ink supply chamber 51 (the concave section 49 of the second flow channel member 50) in the Y direction. The filter 58 is configured to filter ink that flows toward the pressure chamber 52 from the ink supply chamber 51. Flow-through holes 59a are provided in the spring receiving seat 59, and ink is capable of flowing through the flow-through holes. Furthermore, an end of a spring 63 is fixed to or inlayed into the spring receiving seat 59. As a result, the spring 63 is prevented from interfering with the filter 58 by the spring receiving seat 59. The other end of the spring 63 is fixed to the valve body 53.

The valve body 53 is disposed between the spring 63 and the pressure receiving plate 57. The valve body 53 passes through the hole 47, and is capable of opening and closing a flow channel for ink by reciprocating in the Y direction by causing displacement of the film 22. The valve body 53 is configured by a main body 54 and a sealing member 55. The main body 54 passes through the hole 47, and is provided with a plate-shaped section 54a, which is disposed on a side of the ink supply chamber 51, and a shaft section 54b, the tip or front end side of which protrudes into the pressure chamber 52. The sealing member 55 is, for example, configured by an elastic member that is formed from an elastomer, a rubber, or the like, and is disposed on a surface side of the plate-shaped section 54a that opposes the hole 47, so as to surround the shaft section 54b.

In this manner, the valve unit 21 is provided with the first flow channel member 45 that includes the through-hole 46, which passes through the surface 45a and the surface 45b, the film 22 that covers the surface 45a of the through-hole 46, the second flow channel member 50 that is fixed to the first flow channel member 45 and includes the hole 47, which is in communication with a side of the surface 45b of the through-hole 46, and the valve body 53 that passes through the hole 47, and is capable of opening and closing a flow channel by causing the displacement of the film 22, which is in communication with the through-hole 46.

In the valve unit 21, ink that is supplied from the ink cartridge 13 is introduced into the ink supply chamber 51 through an ink introduction channel (not illustrated in the drawing), and is further introduced into the pressure chamber 52 through the hole 47. Ink that is introduced into pressure chamber 52 is introduced to the recording head 20 through an ink lead-through channel 24. Further, the ink introduction channel, the ink supply chamber 51, the hole 47, the pressure chamber 52 and the ink lead-through channel 24 configure a flow channel of ink in the valve unit 21.

Next, an operation of the valve unit 21 will be described with reference to FIG. 3.

In the valve unit 21, since ink is pressurized and supplied to the ink supply chamber 51 through the ink supply tube 17 from the ink cartridge 13, the ink inside the ink supply chamber 51 is in a pressurized state. A pressurizing force (a pressure that acts on the ink inside the ink supply chamber 51) of the ink that is supplied to the ink supply chamber 51 acts on the main body 54 of the valve body 53. Furthermore, a pressure that acts on the ink inside the pressure chamber 52, and a force that is applied from the pressure receiving plate 57, acts on the main body 54 of the valve body 53. The position of the valve body 53 is controlled by the pressure inside the ink supply chamber 51, the pressure that acts on the ink inside the pressure chamber 52, a force that is applied from the pressure receiving plate 57, and the like.

In normal operation states in which the pressure that acts on the ink inside the pressure chamber 52 is maintained within a predetermined range, as shown by the dashed-two dotted line in the figure, the hole 47 of the second flow channel member 50 is maintained in a manner in which the valve body 53 is blocked (hereinafter, referred to as "closed state"). That is, in a non-recording state in which ink is not being ejected from the recording head 20, the sealing member 55 of the valve body 53 is caused to adhere to the second flow channel member 50. The valve body 53 is in a closed state, and the flow channel of ink, which is in communication with the through-hole 46, is closed.

In contrast to this, for example, when ink is consumed due to the ejection of ink or suction from an outer section (for example, cleaning of the recording head 20) and the amount of ink inside the pressure chamber 52 decreases, the pressure that acts on the ink is reduced inside the pressure chamber 52. The film 22 is then displaced to the side of the ink supply chamber 51 (in the Y (−) direction), and the pressure receiving plate 57, which is installed on or fixed to the film 22, applies a pressing force on the main body 54 of the valve body 53. That is, the film 22 functions as a diaphragm that is displaced depending on the pressure that acts on the ink inside the pressure chamber 52. A force (a force in the Y (−) direction) that resists a force (a force in the Y (+) direction), which is applied from the ink supply chamber 51, is applied to the main body 54 of the valve body 53 from the pressure receiving plate 57, which is fixed to the film 22. When this occurs, as shown by the solid line in the figure, the valve unit 21 transitions to a state in which the sealing member 55 of the valve body 53 is separated from the second flow channel member 50 (hereinafter, referred to as an "open state"). When the valve body 53 attains an open state, the flow channel, which is in communication with the through-hole 46, is opened, and the pressure chamber 52 and the ink supply chamber 51 are in communication with one another via the hole 47.

In the valve unit 21, in a non-printing state, that is, a state in which ink is not being consumed, since the valve body 53 is in a closed state even if ink is being pressurized and supplied from the ink cartridge 13, which is on an upstream side of the valve unit 21, ink from the ink cartridge 13 is not supplied to the recording head 20 (the common ink chamber 40), which is on a downstream side of the valve unit 21.

In contrast to this, in a printing state, that is, a state in which ink is being consumed, the amount of ink in the pressure chamber 52 gradually decreases. The pressure chamber 52 reaches a negative pressure as a result of the pressure decreasing in accordance with the decreases in the amount of ink in the pressure chamber 52. As a result of this, the film 22 is displaced in a direction that pushes the valve body 53 down (the Y (−) direction), the valve body 53 attains an open state, and ink is supplied from the ink supply chamber 51 to the pressure chamber 52. In this manner, ink from the ink cartridge 13 is supplied to the recording head 20 (the common ink chamber 40), which is on the downstream side of the valve unit 21. Further, when the negative pressure of the pressure chamber 52 changes as a result of the inflow of ink to the pressure chamber 52 of the valve unit 21, as shown by the dashed-two dotted line the figure, the film 22 transitions in the Y (+) direction, the valve body 53 attains a closed state again, and the supply of ink to the common ink chamber 40 of the recording head 20 is stopped.

In this manner, during a printing operation, the pressure chamber 52 is sequentially replenished with ink while the valve body 53 is slightly open in accordance with the consumption of ink. Furthermore, pressure fluctuations in the ink inside the ink supply chamber 51, which is on the upstream side, are restricted to be within a given predetermined range as a result of the opening and closing of the valve body 53, and closed off from pressure changes inside the pressure chamber 52, which is on the downstream side. Accordingly, even if a pressure change occurs on the upstream side of the valve body 53, the downstream side is not subjected to the effects thereof. Therefore, the pressure that acts on the ink inside the pressure chamber 52 of the valve unit 21, is restricted to a predetermined range, and the supply of ink from the pressure chamber 52 to the common ink chamber 40 of the recording head 20 is performed favorably.

That is, the valve unit 21 has a pressure adjustment function (a flow pressure adjustment mechanism), and controls the flow pressure of ink that is introduced to the recording head 20 to an appropriate range. To explain in more detail, in a normal operation states (the non-printing state and the printing state) in which the pressure adjustment function (the flow pressure adjustment mechanism) by the valve unit 21 is activated, since the valve body 53 opens and closes so that the common ink chamber 40 of the recording head 20 is only automatically filled with ink when ink is running low, it is possible to constantly control the pressure that acts on the ink on the downstream side of the valve unit 21, to be within a given predetermined range. In the printer 1, a negative pressure with respect to atmospheric pressure acts on the ink supplied to the nozzle 43 so that ink does not leak from the nozzles 43, and so that ink is ejected or discharged properly from the nozzles 43.

Supposing the negative pressure acting on the ink supplied to the nozzles 43 is too strong, there is a concern that a problem will arise, such as the ink not being ejected from the nozzles 43 properly during printing. If the negative pressure acting on the ink supplied to the nozzles 43 is too weak, there is a concern that a problem will arise, such as the ink leaking from the nozzles 43 during non-printing.

In order to properly control the flow pressure of the ink supplied to the nozzles 43, it is important for the flow channel of ink to be opened and closed properly as a result of the valve body 53 operating properly or normally in the valve unit 21. As mentioned above, in order for the valve body 53 to operate properly, it is important for the film 22 to be displaced uniformly as a result of the pressure receiving plate 57 being disposed in the center of the through-hole 46 of the first flow channel member 45.

In the manufacturing method according to the present embodiment, the valve unit 21 is manufactured by fixing the first flow channel member 45 and the second flow channel member 50 after fixing the film 22 to the corresponding first flow channel member 45 so that the valve body 53 operates properly. Further, in the valve unit 21 that is manufactured using the corresponding manufacturing method, the flow pressure of the ink is controlled properly by operating the valve body 53 properly.

Hereinafter, the details of this will be described.

Method for Manufacturing Valve Unit

Figure 4:
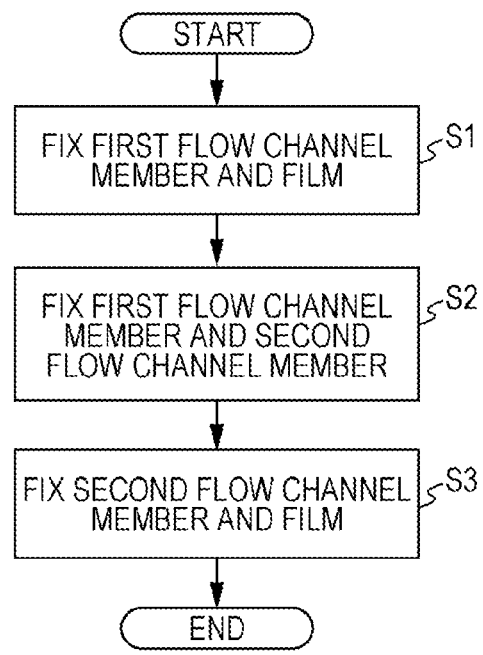
FIG. 4 is a process flow chart diagram that shows a method for manufacturing a valve unit according to Embodiment 1.

FIG. 4 is a process flow chart diagram that shows a method for manufacturing a valve unit according to the present embodiment. FIGS. 5A to 5D are diagrams that correspond to FIG. 3, and are schematic diagrams that show states of the process flow illustrated in FIG. 4.

Hereinafter, a method for manufacturing the valve unit 21 according to the present embodiment will be described with reference to FIGS. 4 to 5D.

As shown in FIG. 4, the method for manufacturing the valve unit 21 according to the present embodiment includes a step (Step S1) that fixes (adheres) the first flow channel member 45 and the film 22, a step (Step S2) that fixes (adheres) the first flow channel member 45 and the second flow channel member 50, and a step (Step S3) that fixes (adheres) the second flow channel member 50 and the film 23.

Additionally, the Step S1 is an example of "covering a side of the surface 45*a* of the through-hole 46 using the film 22 by fixing the first flow channel member 45 and the film 22". The Step S2 is an example of "fixing the second flow channel member 50 and the first flow channel member 45 in a manner in which a side of the surface 45*b* of the through-hole 46 and the hole 47 are in communication with one another".

Figure 5A:
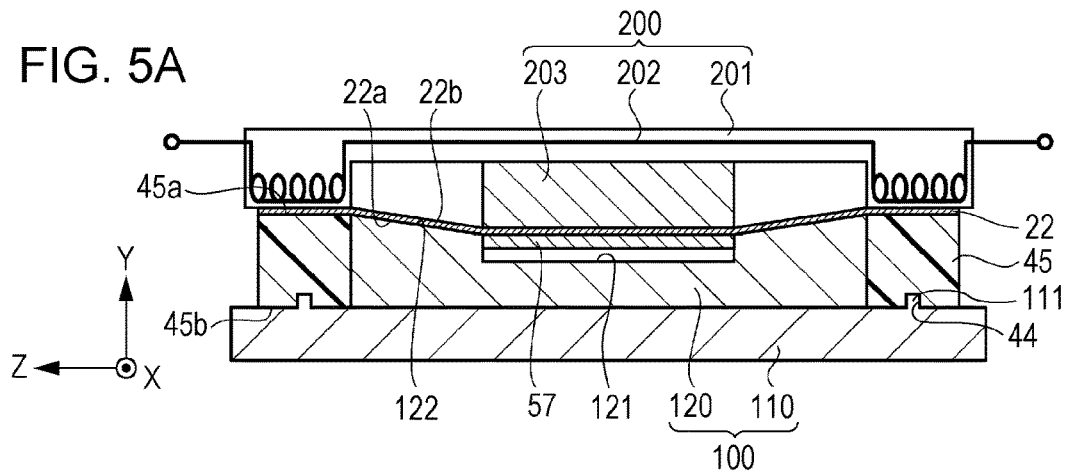
FIGS. 5A to 5D are schematic diagrams that show states of the process flow that is shown in FIG. 4.

In Step S1, as shown in FIG. 5A, the film 22 is fixed (caused to be adhered) to the first flow channel member 45 by performing thermal welding of the first flow channel member 45 and the film 22 using a jig and tool 100 and a heating tool 200. Additionally, the pressure receiving plate 57 is fixed (caused to be adhered) to the film 22 in advance by thermal welding or the like.

Additionally, the jig and tool 100 is an example of a "fixing member".

The jig and tool 100 is configured by a first member 110 and a second member 120. The first member 110 forms a base section of the jig and tool 100, and the second member 120 is attached thereto. Concave sections 111, which are capable of fitting together with the concave sections 44 of the first flow channel member 45, are formed on the first member 110. In other words, the concave sections 111 with the same shape as the convex sections 48 (refer to FIG. 3) of the second flow channel member 50, are formed on the first member 110.

A concave section 121, into which it is possible to inlay the pressure receiving plate 57, is provided in the second member 120. Furthermore, the second member 120 gradually becomes thicker in directions that face the end sections from the concave section 121, and has an inclined surface 122 on a side that comes into contact with the film 22. In other words, the concave section 121 has a shape that is recessed in the Y (−) direction with respect to the surface 45*a* of the first flow channel member 45.

The heating tool 200 includes a holder 201 that emits heat as a result of electrification, a heat-emitting body 202, and a pressing force member 203. The holder 201 supports the heat-emitting body 202, and is configured by a material that transmits heat more easily than the pressing force member 203. The holder 201 transmits the heat of the heat-emitting body 202 to thermal welding targets (the first flow channel member 45 and the film 22). The pressing force member 203 is attached to the holder 201, has superior heat-resistance to those of the thermal welding targets (the first flow channel member 45 and the film 22), and is configured by a material that does not transmit heat as easily as the holder 201. For example, in the present embodiment, the pressing force member 203 is configured by a TEFLON® resin. The pressing force member 203 has substantially the same shape as the pressure receiving plate 57 in plan view, and overlaps the pressure receiving plate 57. A configuration in which the pressing force member 203 overlaps the pressure receiving plate 57 in plan view is preferable, and, for example, a configuration in which the pressing force member 203 is smaller than the pressure receiving plate 57, and the pressing force member 203 is disposed on an inner side of the pressure receiving plate 57, may be used.

In Step S1, the concave sections 44 of the first flow channel member 45 are fitted together with the concave sections 111 of the first member 110, and the pressure receiving plate 57 is inlayed in the concave section 121 of the second member 120. When the concave sections 44 of the first flow channel member 45 are fitted together with the concave sections 111 of the first member 110, it becomes difficult for the position of the first flow channel member 45 to be shifted in the X direction and the Z direction. Therefore, the position of the first flow channel member 45 is controlled by the first member 110. When the pressure receiving plate 57 is inlayed into the concave section 121 of the second member 120, it becomes difficult for the position of the pressure receiving plate 57 to be shifted in the X direction and the Z direction. Therefore, it is possible to control the position of the pressure receiving plate 57 with respect to the first flow channel member 45 with high accuracy using the first member 110 and the second member 120.

When the concave sections 44 of the first flow channel member 45 are fitted together with the concave sections 111 of the first member 110, and the pressure receiving plate 57 is inlayed in the concave section 121 of the second member 120, the pressure receiving plate 57 is disposed in the center of the through-hole 46 of the first flow channel member 45. In other words, the concave sections 111 of the first member 110 and the concave section 121 of the second member 120 are formed in a manner which the pressure receiving plate 57 is disposed in the center of the through-hole 46 of the first flow channel member 45. Accordingly, it is possible to dispose the pressure receiving plate 57 in the center of the through-hole 46 of the first flow channel member 45 with high accuracy.

Next, the heating tool 200 is brought towards the jig and tool 100, while adjusting the position of the heating tool 200 so that adhesive surfaces of the first flow channel member 45 and the film 22 are interposed between the jig and tool 100 and the heating tool 200. To explain in more detail, adhesive surfaces of the first flow channel member 45 and the film 22 are interposed between the jig and tool 100 and the heating tool 200 by bringing the heating tool 200 towards the jig and tool 100 while adjusting the position of the heating tool 200 in a manner in which the concave sections 44 of the first flow channel member 45 are fitted together with the concave sections 111 of the first member 110, and the pressure receiving plate 57 is inlayed in the concave section 121 of the second member 120 (a manner in which the pressure receiving plate 57 is supported by the second member 120).

At this time, the pressing force member 203 of the heating tool 200 applies a pressing force on portions of the film 22 to which the pressure receiving plate 57 is fixed.

When a pressing force is applied to portions of the film 22 to which the pressure receiving plate 57 is fixed by the pressing force member 203 of the heating tool 200, the film 22 is displaced or deformed in the Y (−) direction with respect to the surface 45a of the first flow channel member 45 (a fixing surface of the film 22 and the first flow channel member 45). Further, the film 22 comes into contact with the inclined surface 122 of the second member 120, and is supported in the Y direction by the inclined surface 122 of the second member 120.

When the film 22 is supported by the inclined surface 122 of the second member 120, the film 22 is displaced in the Y (−) direction, and it is possible to control displacement of the film 22 in the Y direction properly using the inclined surface 122.

If the displacement of the film 22 in the Y direction is non-uniform, there is a concern that the reciprocating movement/operation of the valve body 53, which opens and closes the flow channel of the ink as a result of the displacement of the film 22 in the Y direction, will be non-uniform. In the present embodiment, since the displacement of the film 22 in the Y (−) direction is controlled properly by the inclined surface 122, in the valve unit 21, the uniformity of the displacement of the film 22 in the Y direction is improved, the valve body 53 operates properly, and the flow channel of the ink is opened and closed properly.

Furthermore, when the film 22 is supported by the inclined surface 122 of the second member 120, an appropriate amount of tension (tensile force) is applied to the film 22, and it is difficult for wrinkles to form in the film 22.

If wrinkles occur in the film 22, there is a concern that variation in the rigidity within the surface of the film 22 will occur, and displacement of the film in the Y direction will become non-uniform. In the present embodiment, since it is difficult for wrinkles to form in the film 22 due to an appropriate amount of tension being applied to the film 22, in the valve unit 21, variation in the rigidity within the surface of the film 22 is suppressed, uniformity of the displacement of the film 22 in the Y direction is improved, and the flow channel of ink is opened and closed properly as a result of the valve body 53 being operated properly.

Additionally, the heating tool 200 and the jig and tool 100 are formed or designed so that the adhesive surfaces of the first flow channel member 45 and the film 22 are interposed between the jig and tool 100 and the heating tool 200, and the film 22 is supported in the Y direction by the inclined surface 122 of the second member 120.

Figure 5B:
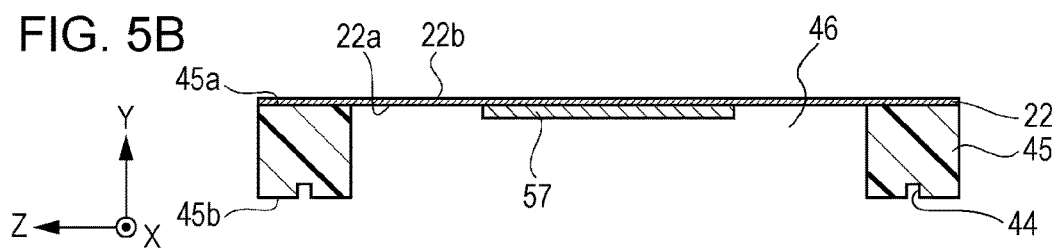

Next, thermal welding of the first flow channel member 45 and the film 22 is performed as a result of heating the adhesive surfaces of the first flow channel member 45 and the film 22 by electrifying the heat-emitting body 202, and as shown in FIG. 5B, a side of the surface 45a of the through-hole 46 is covered or sealed using the film 22 by fixing or performing thermal welding of the first flow channel member 45 and the film 22.

In other words, in Step S1, the pressure receiving plate 57 is supported by the second member 120, the film 22 is displaced in the Y (−) direction with respect to the fixing surface (the surface 45a of the first flow channel member 45) of the film 22 and the first flow channel member 45, and the film 22 and the first flow channel member 45 are fixed in a manner in which the film 22 is supported in the Y direction by the inclined surface 122 of the second member 120.

Since the pressing force member 203 is configured by a material that does not transmit heat as easily as the holder 201, it is difficult for the heat of the heat-emitting body 202 to propagate to the film 22 through the pressing force member 203. That is, it is difficult for the heat of the heat-emitting body 202 to effect portions other than portions that perform thermal welding of the first flow channel member 45 and the film 22. Accordingly, it is difficult for the properties of the film 22 (the film 22 of portions that are displaced), which covers the side of the surface 45a of the through-hole 46, to be changed by heat. If the properties of the film 22 change, and the physical properties (for example, the rigidity) of the film 22 become non-uniform, since the displacement of the film 22 becomes non-uniform, it is possible to improve the uniformity of the displacement of the film 22 by suppressing changes in the properties of the film 22 due to heat.

Furthermore, the tension applied to the film 22 is dependent on the warp amount of the film 22 (the displacement of the film 22). For example, the tension applied to the film 22 is large when the warp amount of the film 22 is large, and the tension applied to the film 22 is small when the warp amount of the film 22 is small.

Furthermore, the warp amount of the film 22 (the displacement of the film 22) is suppressed by the inclined surface 122 of the second member 120. For example, the warp amount of the film 22 is large at the inclined surface 122 having a steep incline with respect to a surface that the X direction and the Z direction form, and the warp amount of the film 22 is small at the inclined surface 122 having a gentle incline with respect to a surface that the X direction and the Z direction form.

That is, the inclined surface 122 of the second member 120 adjusts the tension applied to the film 22, and has a role of appropriately adjusting the tension applied to the film 22 so that an excessive amount of tension is not applied in Step S1.

Furthermore, when the adhesive surfaces of the first flow channel member 45 and the film 22 are interposed between the heating tool 200 and the jig and tool 100, and the film 22 is supported by the inclined surface 122 of the second member 120, since movement of the pressing force member 203 in the Y (−) direction is suppressed, an excessive amount of force is not applied to the film 22 from the pressing force member 203.

Accordingly, when the film 22 is supported by the inclined surface 122 of the second member 120, the tension applied to the film 22 is appropriately adjusted, and it is difficult for an excessive amount of tension to be applied to the film 22. Accordingly, when the first flow channel member 45 and the film 22 are fixed when the film 22 is supported by the inclined surface 122 of the second member 120, it is possible to fix (perform thermal welding of) the first flow channel member 45 and the film 22 properly without an excessive amount of force acting on portions in which the first flow channel member 45 and the film 22 are fixed.

If an excessive amount of force acts on portions in which the first flow channel member 45 and the film 22 are fixed, there is a concern that the film 22 will peel away from the first flow channel member 45. In the present embodiment, since an excessive amount of force is not applied to portions in which the first flow channel member 45 and the film 22 are fixed as a result of the film 22 being supported by the inclined surface 122 of the second member 120, it is possible to suppress such possibility.

Figure 5C:
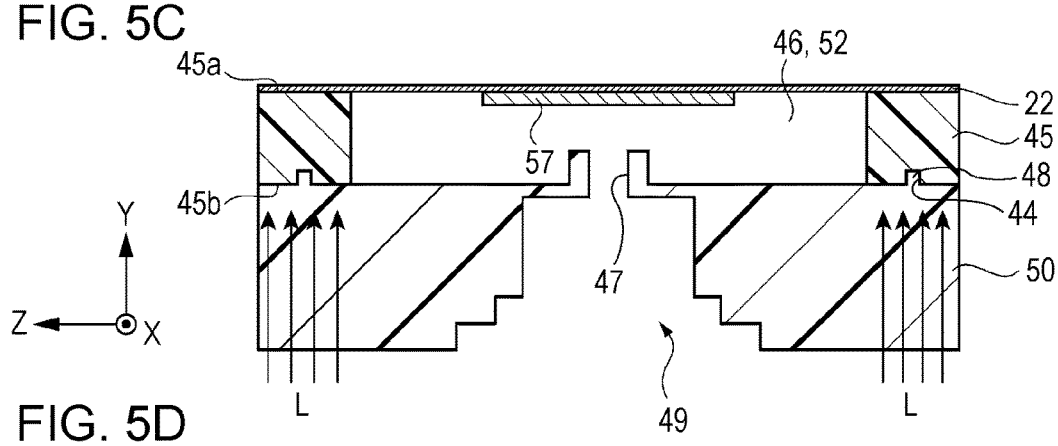

In Step S2, as shown in FIG. 5C, the second flow channel member 50 is disposed on the first flow channel member 45, with the side of the surface 45a of the through-hole 46 being covered by the film 22. To explain in more detail, the second flow channel member 50 is disposed on the first flow channel member 45 in a manner in which the convex sections 48 of the second flow channel member 50 fit together with the concave sections 44 of the first flow channel member 45.

That is, the process of Step S2 is carried out in a manner in which the positioning pins that position the first flow channel member 45 and the second flow channel member 50 are provided on the inner side, in plan view, of portions in which the first flow channel member 45 and the second flow channel member 50 are fixed.

Furthermore, when the concave sections 44 of the first flow channel member 45 and the convex sections 48 of the second flow channel member 50 fit together with one another, portions in which the film 22 and the first flow channel member 45 are fixed overlap, in plan view, with portions in which the first flow channel member 45 and the second flow channel member 50 are fixed. That is, the process of Step S2 is carried out in a manner in which portions in which the film 22 and the first flow channel member 45 are fixed overlap, in plan view, with portions in which the first flow channel member 45 and the second flow channel member 50 are fixed.

When the convex sections 48 of the second flow channel member 50 fit together with the concave sections 44 of the first flow channel member 45, it is possible to control the position of the second flow channel member 50 with respect to the first flow channel member 45 with high accuracy. To explain in more detail, when the convex sections 48 of the second flow channel member 50 fit together with the concave sections 44 of the first flow channel member 45, the side of the surface 45b of the through-hole 46 of the first flow channel member 45 and the hole 47 of the second flow channel member 50 are in communication with one another, and the hole 47 of the second flow channel member 50 is disposed in the center of the through-hole 46 of the first flow channel member 45 and the pressure receiving plate 57.

Next, laser light L, which is shown by an arrow in the drawing, is irradiated in the Y direction from a side of the second flow channel member 50. The laser light L is transmitted through the second flow channel member 50 and is absorbed by the first flow channel member 45. As a result of this, contact surfaces between the second flow channel member 50 and the first flow channel member 45 are heated locally, and laser welding of the second flow channel member 50 and the first flow channel member 45 is performed. In other words, the second flow channel member 50 and the first flow channel member 45 are fixed, that is, laser welding thereof is performed, in a manner in which the side of the surface 45b of the through-hole 46 of the first flow channel member 45, and the hole 47 of the second flow channel member 50 are in communication with one another.

Additionally, although illustration is omitted in FIG. 5C, in Step S2, the first flow channel member 45 and the second flow channel member 50 are fixed in a manner in which the spring 62 is pre-stored in the center of the through-hole 46.

In the laser welding, it is possible to locally heat portions in which the laser light L is absorbed, or in other words, required locations. In other words, portions in which laser welding is performed are heated locally, and it is difficult for portions in which laser welding is not performed to be heated.

For example, when thermal welding of the second flow channel member 50 and the first flow channel member 45 is performed by the above-mentioned heating tool 200, portions that are not adhered are also heated, and there is a concern that the second flow channel member 50 and the first flow channel member 45 will be thermally deformed. Even if the second flow channel member 50 is configured by a material that is thicker than the films 22 and 23, as a result of performing laser welding of the second flow channel member 50 and the first flow channel member 45, it is difficult for portions that are not adhered to be heated, and thermal deformation of the second flow channel member 50 and the first flow channel member 45 is suppressed.

In this manner, in Step S2, it is possible to fix the first flow channel member 45 and the second flow channel member 50 at predetermined positions with high accuracy using the concave sections 44 and the convex sections 48 while suppressing thermal deformation of the second flow channel member 50 and the first flow channel member 45.

Figure 5D:
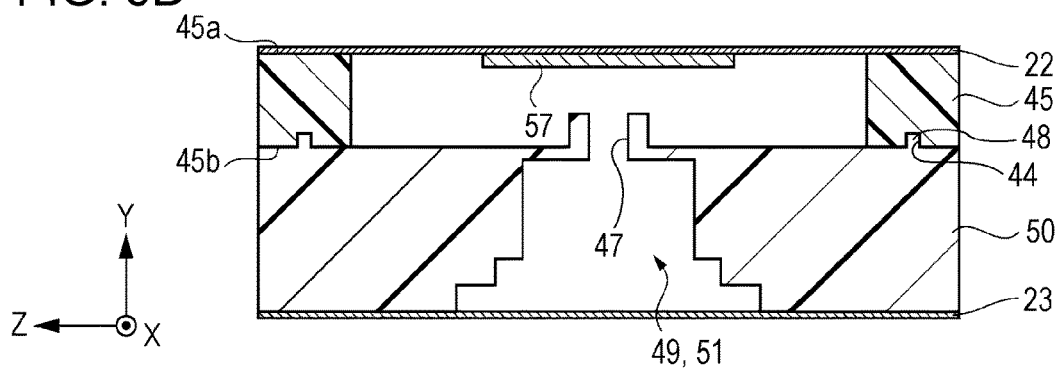

In Step S3, as shown in FIG. 5D, the opening of the concave section 49 of the second flow channel member 50 is covered by the film 23 by performing thermal welding of the film 23 to the second flow channel member 50 in the same manner as that of Step S1.

Additionally, although illustration is omitted in FIG. 5D, in Step S3, thermal welding of the film 23 to the second flow channel member 50 is performed in a manner in which the valve body 53, the spring 63, the spring receiving seat 59 and the filter 58 are stored in the center of the concave section 49 of the second flow channel member 50.

In the abovementioned manner, in the method for manufacturing the valve unit 21 according to the present embodiment, it is possible to obtain the following effects.

(1) It is possible to dispose the pressure receiving plate 57 in the center of the through-hole 46 of the first flow channel member 45 by controlling the position of the pressure receiving plate 57 with respect to the first flow channel member 45 with high accuracy using the jig and tool 100 (the first member 110 and the second member 120).

(2) Since the pressing force member 203 of the heating tool 200 is configured by a material that does not transmit heat as easily as the holder 201, it is difficult for the heat of the heat-emitting body 202 to propagate to the film 22 (the film 22 of portions that are displaced), which covers the side of the surface 45a of the through-hole 46. Therefore, it is difficult for the properties of the film 22 to change. When the properties of the film 22 change, and the physical properties (for example, the rigidity) of the film 22 become non-uniform, since the displacement of the film 22 becomes non-uniform, it is possible to improve the uniformity of the displacement of the film 22 by suppressing changes in the properties of the film 22.

(3) In Step S1, the displacement of the film 22 in the Y (−) direction is controlled properly by the inclined surface 122 of the second member 120 so that the displacement of the film 22 in the Y direction is uniform. As a result of this, it is possible to improve the uniformity of the displacement of the film 22 of the valve unit 21 in the Y direction.

(4) In Step S1, an appropriate amount of tension (tensile force) is applied to the film 22. Therefore, it is difficult for wrinkles to occur in the film 22. As a result of this, variation in the rigidity of the surface of the film 22 of the valve unit 21 is suppressed. Therefore, it is possible to improve the uniformity of the displacement of the film 22 in the Y direction.

(5) It is possible to appropriately adjust the tension that is applied to the film 22 in Step S1 using the jig and tool 100 (the inclined surface 122 of the second member 120) and the heating tool 200 (the pressing force member 203). Accordingly, a defect in which the film 22 peels away from portions that are attached to the first flow channel member 45, is suppressed without an excessive amount of force being applied to portions in which the first flow channel member 45 and the film 22 are fixed. Therefore, it is possible to adhere or perform thermal welding of the first flow channel member 45 and the film 22 appropriately.

(6) Since the pressure receiving plate 57 is disposed in the center of the through-hole 46 of the first flow channel member 45, and the uniformity of the displacement of the film 22 is improved as a result of (1) to (5) above, the valve body 53 opens and closes properly. Therefore, it is possible to control the flow pressure of the ink that is supplied to the nozzle 43 properly.

(7) Since the first flow channel member 45 and the second flow channel member 50 are fixed or adhered by laser welding in which localized heating is possible, it is possible to suppress adverse effects of heating (for example, thermal deformation of the first flow channel member 45 and the second flow channel member 50) without unnecessary heat being applied to sections other than contact sections.

Embodiment 2

Figure 6:
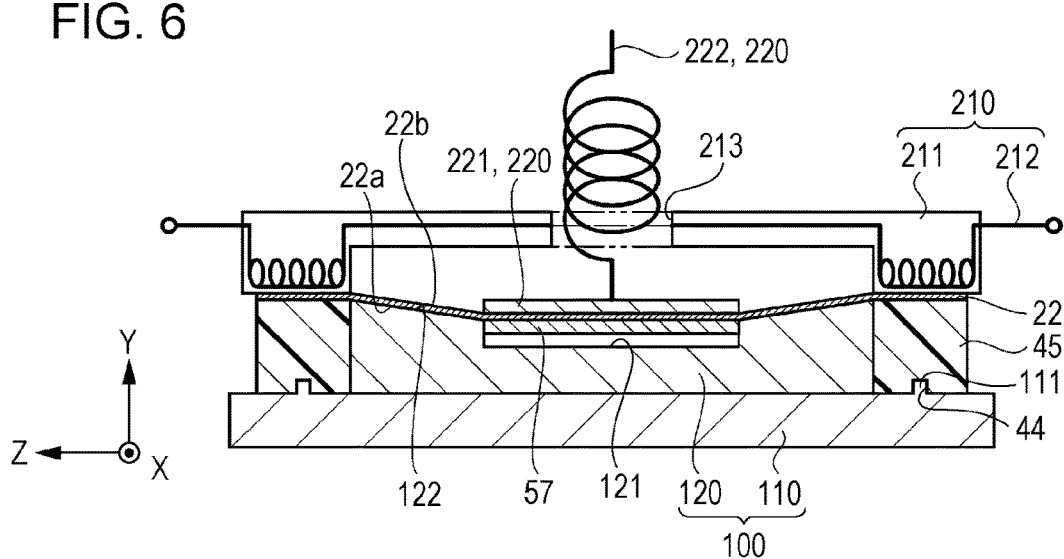
FIG. 6 is a diagram that illustrates a state of a method for manufacturing a valve unit according to Embodiment 2.

FIG. 6 is a diagram that describes a manner of a method for manufacturing a valve unit according to Embodiment 2. To explain in more detail, FIG. 6 is a diagram that corresponds to FIG. 5A, and describes a step (Step S1) of adhering the first flow channel member 45 and the film 22.

In the method for manufacturing the valve unit 21 according to the present embodiment, in Step S1, the manners of the heating tool and the pressing force member are different from those of Embodiment 1, but the rest is the same as Embodiment 1.

Hereinafter, the method for manufacturing the valve unit 21 according to the present embodiment will be described with reference to FIG. 6 focusing on the points that differ from Embodiment 1. In addition, structures that are the same as those of Embodiment 1 will be given the same reference numerals, and overlapping descriptions thereof will be omitted.

In Step S1, as shown in FIG. 6, the film 22 is fixed or caused to adhere to the first flow channel member 45 by performing thermal welding of the first flow channel member 45 and the film 22 using the jig and tool 100, a heating tool 210, and a pressing force member 220.

The jig and tool 100 is the same as in Embodiment 1, and is configured by the first member 110 and the second member 120.

The heating tool 210 includes a heat-emitting body 212, which emits heat as a result of electrification, and a holder 211. The holder 211 supports the heat-emitting body 212, is configured by a material that transmits heat easily, and includes an opening 213. The heating tool 210 according to the present embodiment does not include the pressing force member 220, and the fact that the heating tool 200 according to Embodiment 1 includes the pressing force member 203 is a difference between the present embodiment and Embodiment 1.

The pressing force member 220 includes a pressing force section 221 and an elastic section 222. The pressing force section 221 is, for example, configured by a TEFLON® resin, which does not transmit heat easily, and in Step S1, applies a pressing force on a portion of the film 22 to which the pressure receiving plate 57 is fixed. The elastic section 222 is a spring, for example, and is disposed so as to penetrate through the opening 213 of the heating tool 210. The fact that the pressing force member 220 (the elastic section 222) and the heating tool 210 do not come into contact with one another is also a difference between the present embodiment and Embodiment 1.

Additionally, the elastic section 222 may be configured by a material having an elastic property, and may, in addition to the above-mentioned spring, be configured by an elastic rubber.

A side of the surface 45a of the through-hole 46 of the first flow channel member 45 is covered by the film 22 by performing thermal welding of the first flow channel member 45 and the film 22 through heating the adhesive surfaces of the first flow channel member 45 and the film 22 due to electrification of the heat-emitting body 212 of the heating tool 210 in a manner in which a portion of the film 22 in which the pressure receiving plate 57 is fixed applies a pressing force on the pressing force section 221 of the pressing force member 220, and the film 22 is supported by the inclined surface 122 of the second member 120.

Since the pressing force member 220 does not come into contact with the heating tool 210, in comparison with Embodiment 1, it is difficult for the heat of the heating tool 210 (the heat-emitting body 212) to propagate to the pressing force member 220 when thermal welding of the first flow channel member 45 and the film 22 is performed by the heating tool 210.

For example, in Embodiment 1, since the pressing force member 203 comes into contact with the holder 201, which supports the heat-emitting body 202, in comparison with a case in which the pressing force member 203 does not come into contact with the holder 201, it is easy for the heat of the heat-emitting body 202 to propagate to the pressing force member 203. Therefore, in Embodiment 1, it is easy for the film 22 to be subjected to the effects of heat that propagates to the pressing force member 203 when thermal welding of the first flow channel member 45 and the film 22 is performed. If the film 22 is subjected to the effects of heat, there is a concern that the uniformity of the displacement of the film 22 will deteriorate.

In the present embodiment, since the pressing force member 220 does not come into contact with the holder 211 that supports the heat-emitting body 212, it is not easy for the heat of the heat-emitting body 212 to propagate to the pressing force member 220 in comparison with Embodiment 1. Accordingly, in the present embodiment, in comparison with Embodiment 1, it is difficult for the film 22 to be subjected to the effects of heat. Therefore, it is possible to suppress deteriorations in the uniformity of the displacement of the film 22. Accordingly, in the present embodiment, in comparison with Embodiment 1, the uniformity of the displacement of the film 22 and the uniformity of the opening and closing of the valve body 53 are improved. Therefore, it is possible to more properly control the flow pressure of the ink that is supplied to the nozzles 43.

Embodiment 3

Figure 7:
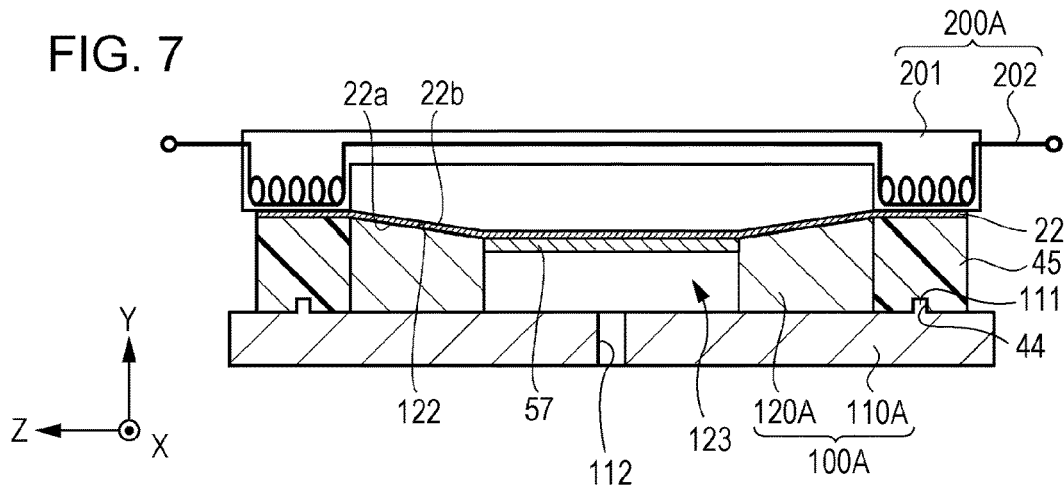
FIG. 7 is a diagram that describes a state of a method for manufacturing a valve unit according to Embodiment 3.

FIG. 7 is a diagram that describes a manner of a method for manufacturing a valve unit according to Embodiment 3. To explain in more detail, FIG. 7 is a diagram that corresponds to FIG. 5A, and describes a step (Step S1) of adhering the first flow channel member 45 and the film 22.

In the method for manufacturing the valve unit 21 according to the present embodiment, in Step S1, the method for supporting the film 22 using the inclined surface 122 of the second member 120 is different from that of Embodiment 1, but the rest is the same as Embodiment 1.

Hereinafter, the method for manufacturing the valve unit 21 according to the present embodiment will be described with reference to FIG. 7 focusing on the points that differ from Embodiment 1. In addition, structures that are the same as those of Embodiment 1 will be given the same reference numerals, and overlapping descriptions thereof will be omitted.

In Step S1, as shown in FIG. 7, the film 22 is fixed to the first flow channel member 45 by performing thermal welding of the first flow channel member 45 and the film 22 in a manner in which the film 22 is supported by the inclined surface 122 of the second member 120 using a jig and tool 100A and a heating tool 200A.

The jig and tool 100A is configured by a first member 110A and a second member 120A. The first member 110A forms a base section of the jig and tool 100A, and the second member 120A is attached thereto. Concave sections 111, which are capable of fitting together with the concave sections 44 of the first flow channel member 45, are formed on the first member 110A. Furthermore, a hole 112, which passes the first member 110A, is formed in the vicinity of the center of the first member 110A.

The second member 120A includes the same inclined surface 122 as the second member 120 in Embodiment 1. Furthermore, a through-hole 123, which passes the second member 120A, and into which it is possible to inlay the pressure receiving plate 57, is formed in the second member 120A. The through-hole 123 of the second member 120A has the same role as the concave section 121 of the second member 120 in Embodiment 1, and controls the position of the pressure receiving plate 57 with high accuracy as a result of the pressure receiving plate 57 being inlayed in the through-hole 123 in Step S1. Furthermore, the through-hole 123 of the second member 120A is in communication with the hole 112 of the first member 110A.

The heating tool 200A includes the heat-emitting body 202 that emits heat as a result of electrification, and the holder 201 that supports the heat-emitting body 202. The heating tool 200 according to Embodiment 1 includes the pressing force member 203, and the fact that the heating tool 200A according to the present embodiment does not include the pressing force member 203 is a difference between the present embodiment and Embodiment 1.

In Step S1, after the concave sections 44 of the first flow channel member 45 are fitted together with the concave sections 111 of the first member 110A, and the pressure receiving plate 57 is inlayed in the through-hole 123 of the second member 120A, air in a region (hereinafter, referred to as a region R) that is surrounded by the pressure receiving plate 57, the through-hole 123 of the second member 120A and the first member 110A is ventilated through the hole 112 of the first member 110A. When this occurs, the pressure of the region R reaches a negative pressure in comparison with atmospheric pressure, the pressure receiving plate 57 is displaced or suctioned in the Y (−) direction with respect to the surface 45a of the first flow channel member 45, and the film 22, to which the pressure receiving plate 57 is fixed, is also displaced in the Y (−) direction with respect to the surface 45a of the first flow channel member 45. As a result of this, the film 22 is supported by the inclined surface 122 of the second member 120A. When the film 22 is supported by the inclined surface 122 of the second member 120A, an appropriate amount of tension (tensile force) acts on the film 22, and it is difficult for wrinkles or the like, to form in the film 22.

Next, a side of the surface 45a of the through-hole 46 of the first flow channel member 45 is covered by the film 22 by thermal welding the first flow channel member 45 and the film 22 through heating the adhesive surfaces of the first flow channel member 45 and the film 22 due to electrification of the heat-emitting body 202 of the heating tool 200A, while the film 22 is supported by the inclined surface 122 of the second member 120A.

In other words, in Step S1, the film 22 and the first flow channel member 45 are fixed in a manner in which the film 22 is displaced in a direction that faces the surface 22a from the surface 22b because of suction from a side of the surface 22a of the film 22. Additionally, in Embodiment 1, the film 22 and the first flow channel member 45 are fixed by thermally welding the film 22, with the film 22 being displaced in a direction that faces the surface 22a from the surface 22b as a result of a pressing force by the pressing force member 203. This feature is a difference between the present embodiment and Embodiment 1.

In the present embodiment, the film 22 is supported by the inclined surface 122 of the second member 120A by suctioning the pressure receiving plate 57 as the air in the region R is ventilated through the hole 112, without using a pressing force member. In the present embodiment, since a pressing force member is not used, in comparison with Embodiment 1, it is difficult for the film 22 to be subjected to the effects of the heat of the heat-emitting body 202. Accordingly, in the present embodiment, in comparison with Embodiment 1, it is difficult for the film 22 to be subjected to the effects of heat. Therefore, it is possible to suppress deteriorations in the uniformity of the displacement of the film 22. Accordingly, in the present embodiment, in comparison with Embodiment 1, the uniformity of the displacement of the film 22 and the uniformity of the opening and closing of the valve body 53 are improved. Therefore, it is possible to more properly control the flow pressure of the ink that is supplied to the nozzles 43.

Embodiment 4

Figure 8:
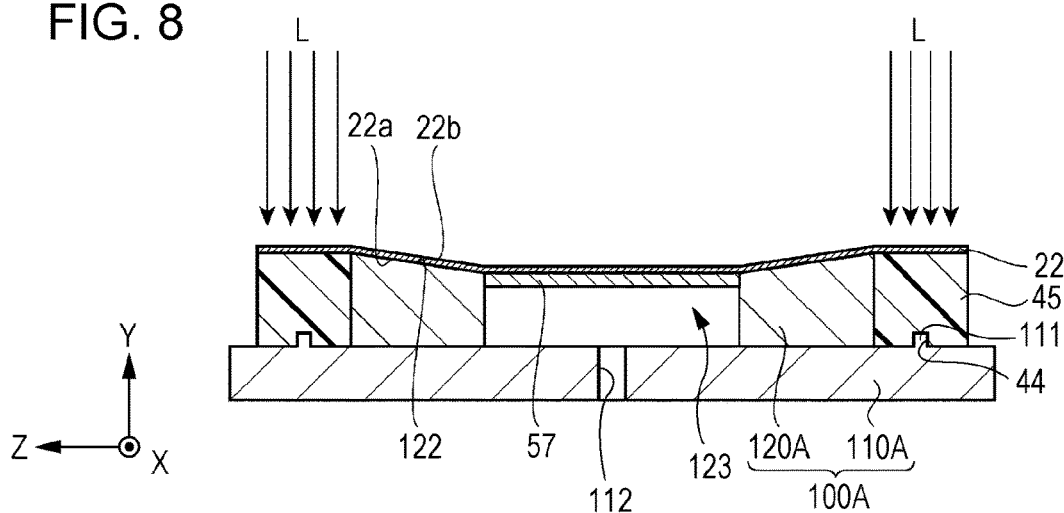
FIG. 8 is a diagram that describes a state of a method for manufacturing a valve unit according to Embodiment 4.

FIG. 8 is a diagram that describes a manner of a method for manufacturing a valve unit according to Embodiment 4. To explain in more detail, FIG. 8 is a diagram that corresponds to FIG. 7, and describes a step (Step S1) of adhering the first flow channel member 45 and the film 22.

In the method for manufacturing the valve unit 21 according to the present embodiment, in Step S1, the method for fixing or adhering the first flow channel member 45 and the film 22 is different from that of Embodiment 3, but the rest is the same as Embodiment 3.

Hereinafter, the method for manufacturing the valve unit 21 according to the present embodiment will be described with reference to FIG. 8 focusing on the points that differ from Embodiment 3. In addition, structures that are the same as those of Embodiment 3 will be given the same reference numerals, and overlapping descriptions thereof will be omitted.

In Step S1, as shown in FIG. 8, the film 22 is supported by the inclined surface 122 of the second member 120A by forming a negative pressure in region R as a result of the air in the region R being ventilated through the hole 112. Next, the contact surfaces of the first flow channel member 45 and the film 22 are irradiated with laser light L from a side of the film 22 in a manner in which the film 22 is supported by the inclined surface 122 of the second member 120A. The laser light L is transmitted through the film 22 and is absorbed by the first flow channel member 45. As a result of this, contact surfaces between the film 22 and the first flow channel member 45 are heated locally, and laser welding of the film 22 and the first flow channel member 45 is performed.

That is, in Step S1, the film 22 and the first flow channel member 45 are fixed by laser welding. Furthermore, in Step S2, the first flow channel member 45 and the second flow channel member 50 are fixed by laser welding.

In other words, portions that are irradiated with the laser light L are heated locally, and it is difficult for portions that are not irradiated with the laser light L to be heated. Meanwhile, in the method that heats using the heating tool 200A in Embodiment 3, in comparison with laser welding, it is easy for portions other than the contact surfaces between the first flow channel member 45 and the film 22 to be subjected to the heat generated by the heat-emitting body 202. That is, in the heating method according to the present embodiment (irradiation with the laser light L), in comparison with the heating method according to Embodiment 3 (heating with the heat-emitting body 202), it is difficult for heat to propagate to portions other than the contact surfaces between the first flow channel member 45 and the film 22. Therefore, it is difficult for the film 22 to be subjected to the effects of heat.

Accordingly, in the present embodiment, in comparison with Embodiment 3, it is difficult for the film 22 to be subjected to the effects of heat. Therefore, it is possible to further suppress deteriorations in the uniformity of the displacement of the film 22. Accordingly, in the present embodiment, in comparison with Embodiment 3, the uniformity of the displacement of the film 22 and the uniformity of the opening and closing of the valve body 53 are improved. Therefore, it is possible to more properly control the flow pressure of the ink that is supplied to the nozzles 43.

The present invention is not limited to the abovementioned embodiments, and can be changed as appropriate within a range that does not depart from the scope or the idea of the invention that can be understood from the claims and the entirety of the specification, and in addition to the above-mentioned embodiments it is possible to consider various modification examples. Hereinafter, modification examples will be described. Modification Example 1

In Embodiment 1 to Embodiment 4, in Step S1, the film 22 is supported by the inclined surface 122 of the second member 120 by displacing the film 22 in the Y (−) direction with respect to the surface 45a of the first flow channel member 45 (the fixing surface of the film 22 and the first flow channel member 45). The direction in which the film 22 is displaced in Step S1 is not limited to the Y (−) direction. The direction in which the film 22 is displaced in Step S1 may be the Y (+) direction. That is, the film 22 may be supported by the inclined surface 122 of the second member 120 by displacing the film 22 in the Y (+) direction with respect to the surface 45a of the first flow channel member 45 (the fixing surface of the film 22 and the first flow channel member 45).

For example, in Embodiment 1 and Embodiment 2, a configuration in which an inclined surface, which is convex on a side in the Y (+) direction is formed on the second members 120 and 120A, and the film 22 is supported by the inclined surface of the second member 120 by displacing the film 22 in the Y (+) direction with respect to the surface 45a of the first flow channel member 45, may be used.

Modification Example 2

In Embodiment 3 and Embodiment 4, in Step S1, the film 22 is displaced in the Y (−) direction by suctioning the pressure receiving plate 57 through region R having a negative pressure (a pressure that is lower than that of the atmosphere) due to the ventilation of the air in the region R through the hole 112. The method that displaces the film 22 may have a configuration in which the film 22 is displaced in the Y (+) direction by applying a pressing force on the pressure receiving plate 57 as a result of making the region R have a positive pressure (a predetermined that is higher than that of the atmosphere) due to the supply of air to the region R.

For example, in Embodiment 3 and Embodiment 4, a configuration in which an inclined surface, which is convex on a side in the Y (+) direction is formed on the second members 120 and 120A, and the film 22 is supported by the inclined surface of the second member 120 by displacing the film 22 in the Y (+) direction with respect to the surface 45a of the first flow channel member 45 by applying a pressing force on the pressure receiving plate 57 through making the region R have a positive pressure (a predetermined that is higher than that of the atmosphere). Modification Example 3

The method that displaces the film 22 is not limited to a method that applies a pressing force on the film 22 using the pressing force members 203 and 220 or a method that suctions the film 22. For example, the film 22 may be displaced using static electricity, a magnetic force, or the like, and for example, the film 22 may be displaced as a result of coming into contact with a balloon (a pressing force being applied thereto by a balloon), and for example, the film 22 may be displaced as a result of blowing air thereagainst.

Modification Example 4

The method of fixing or adhering the first flow channel member 45 and the film 22 is not limited to thermal welding using a heating tool or laser welding, and for example, the first flow channel member 45 and the film 22 may be fixed or adhered using an adhesive.

For example, the first flow channel member 45 and the film 22 may be fixed (adhered) by disposing a photocurable resin (an adhesive) between the first flow channel member 45 and the film 22, and curing the photocurable resin (adhesive) by irradiating the contact surfaces of the first flow channel member 45 and the film 22 with light. The method that cures the adhesive through irradiation with light can suppress a circumstance in which portions other than the portions in which the first flow channel member 45 and the film 22 are fixed (adhered) are subjected to the effects of heat.

Modification Example 5

The first flow channel member 45 is configured by a member that absorbs laser light, the second flow channel member 50 is configured by a member that transmits laser light, and laser welding of the first flow channel member 45 and the second flow channel member 50 is performed by irradiating a side of the second flow channel member 50 with the laser light L, but the invention is not limited thereto. For example, a configuration in which the second flow channel member 50 is configured by a member that absorbs laser light, the first flow channel member 45 is configured by a member that transmits laser light, and laser welding of the first flow channel member 45 and the second flow channel member 50 is performed by irradiating a side of the first flow channel member 45 with the laser light L, may also be used.

That is, one of the first flow channel member 45 and the second flow channel member 50 is a transmissive member that transmits the laser light L, and the other of first flow channel member 45 and the second flow channel member 50 is a non-transmissive member that does not transmit the laser light L.

CROSS REFERENCES TO RELATED APPLICATIONS

This application claims priority to Japanese Patent Application No. 2015-125409 filed on Jun. 23, 2015. The entire disclosure of Japanese Patent Application No. 2015-125409 is hereby incorporated herein by reference.

What is claimed is:

1. A valve unit comprising:
a first flow channel member including a first surface, a second surface and a through-hole that passes through the first surface and the second surface;
a flexible member that covers the through-hole at the first surface side of the through-hole;
a second flow channel member fixed to the first flow channel member and including a hole communicating with the through-hole on a second surface side of the through-hole
a pressure chamber corresponding to a space that is surrounded by the through-hole, the flexible member and the second flow channel member; and
a valve body that passes through the hole and is configured to open and close, according to displacement of the flexible member, a flow channel, the flow channel including the hole and the pressure chamber, wherein the valve body opens the flow channel when a negative pressure is generated in the pressure chamber.

2. The valve unit according to claim 1,
wherein one of the first flow channel member and the second flow channel member is a transmissive member that transmits laser light, and
wherein the other of the first flow channel member and the second flow channel member is a non-transmissive member that does not transmit laser light.

3. The valve unit according to claim 1,
wherein the flexible member includes a first surface that is fixed to the first flow channel member and a second surface on a side that is opposite to the first surface, and
wherein, in a perspective view in a direction from the first surface of the first flow channel member to the second surface of the first flow channel member, a portion in which the flexible member and the first flow channel member are fixed overlaps a portion in which the first flow channel member and the second flow channel member are fixed.

4. The valve unit according to claim 3,
wherein, in the perspective view, a positioning pin that positions the first flow channel member and the second flow channel member is provided on an inner side of a portion in which the first flow channel member and the second flow channel member are fixed.

5. The valve unit according to claim 1, wherein a pressure receiving plate is fixed to the flexible member and wherein the pressure receiving plate is harder than the flexible member.

6. The valve unit according to claim 1, wherein a filter is positioned in the second flow channel member and configured to filter a liquid that passes through the valve unit.

7. The valve unit according to claim 1, further comprising a second flexible member that is fixed to a side of the second flow channel member opposite a side of the second flow channel member fixed to the first flow channel member.

8. The valve unit according to claim 7, wherein the flexible member and the second flexible member are formed of a film.

9. The valve unit according to claim 1, wherein an end of the valve body is disposed in the pressure chamber.

10. The valve unit according to claim 1, further comprising:
a biasing member that is disposed around a portion of the valve body, the biasing member being disposed in the flow channel.

11. The valve unit according to claim 1, further comprising:
a pressure receiving plate fixed to the flexible member, wherein, in a perspective view in a direction from the first surface of the first flow channel member to the second surface of the first flow channel member, the pressure receiving plate is disposed in a center of the through hole.

* * * * *